United States Patent
Baker

[11] Patent Number: 5,881,820
[45] Date of Patent: Mar. 16, 1999

[54] OFFSET/TANDOM DISC-TYPE TILLAGE IMPLEMENT

[76] Inventor: Robert S. Baker, 803 4$^{th}$ St., Alva, Okla. 73717

[21] Appl. No.: 804,322

[22] Filed: Feb. 21, 1997

[51] Int. Cl.$^6$ ..................................................... A01B 63/00
[52] U.S. Cl. ......................... 172/455; 172/314; 172/196; 172/311
[58] Field of Search ..................... 172/314, 584, 172/178, 595, 454, 455, 583, 140, 196, 311, 579, 776, 22, 441, 442, 586

[56] References Cited

U.S. PATENT DOCUMENTS

| | | | |
|---|---|---|---|
| 2,136,550 | 11/1938 | Howard | 97/77 |
| 2,539,632 | 1/1951 | Miller | 97/54 |
| 2,632,987 | 3/1953 | Jones | 172/595 |
| 2,994,387 | 8/1961 | Lehman et al. | 172/587 |
| 3,088,527 | 5/1963 | Burch | 172/579 |
| 3,209,840 | 10/1965 | Lehman | 172/584 |
| 3,327,787 | 6/1967 | Adee | 172/311 |
| 3,845,825 | 11/1974 | Boone et al. | 172/158 |
| 4,002,334 | 1/1977 | Wilbeck | 172/581 |
| 4,044,842 | 8/1977 | Worick | 172/314 |
| 4,113,028 | 9/1978 | Glueck | 172/178 |
| 4,300,853 | 11/1981 | Jones | 404/92 |
| 4,492,272 | 1/1985 | Jensen | 172/178 |
| 4,723,787 | 2/1988 | Hadley et al. | 172/311 |
| 4,785,891 | 11/1988 | Noland | 172/579 |
| 5,082,064 | 1/1992 | Landoll et al. | 172/584 X |
| 5,161,622 | 11/1992 | Bodbersen | 172/178 X |
| 5,207,279 | 5/1993 | Nelson et al. | 172/178 X |
| 5,462,123 | 10/1995 | Harlan et al. | 172/545 |

OTHER PUBLICATIONS

Sunflower, Series 4000, Brochure, p. 7, Dec. 1991.
Krause 3200 Series heavy-duty "flex-wing" tandem disc harrow brouchure, pp. 1–2, Jan. 1991.
Hunt, Farm Power and Machinery Management, (no date) 7 pages.
Sunflower Mfg. Co., Inc, Sunflower, (no date) 12 pages.
Johnson/Miller, Johnson Breaking New Ground, (no date) 8 pages.
Krause plow Corporation, Grounds for Owning a Krause, (no date) 28 pages.
Summers Manufacturing Company, Inc, *Herman Diamond Disk* (1991) 4 pages.

*Primary Examiner*—Victor Batson
*Attorney, Agent, or Firm*—Robert Treece

[57] ABSTRACT

An improved disc-type ground tillage implement for tilling ground. The implement has a frame connectable to a towing machine and having multiple pairs of gangs of blades connected to the frame. The frame is supported by a plurality of wheels which may be used to raise and lower the implement in relation to the ground. Each of the pairs of blade gangs includes a front and a rear gang, there being a pair of outer right blade gangs, at least one pair of center blade gangs and a pair of outer left blade gangs. The front and the rear gangs of the outer right and the outer left gang pairs converge as they extend out away from the left-right center of the frame and the outer left and outer right gangs are non-continuous with a center gang pair.

10 Claims, 2 Drawing Sheets

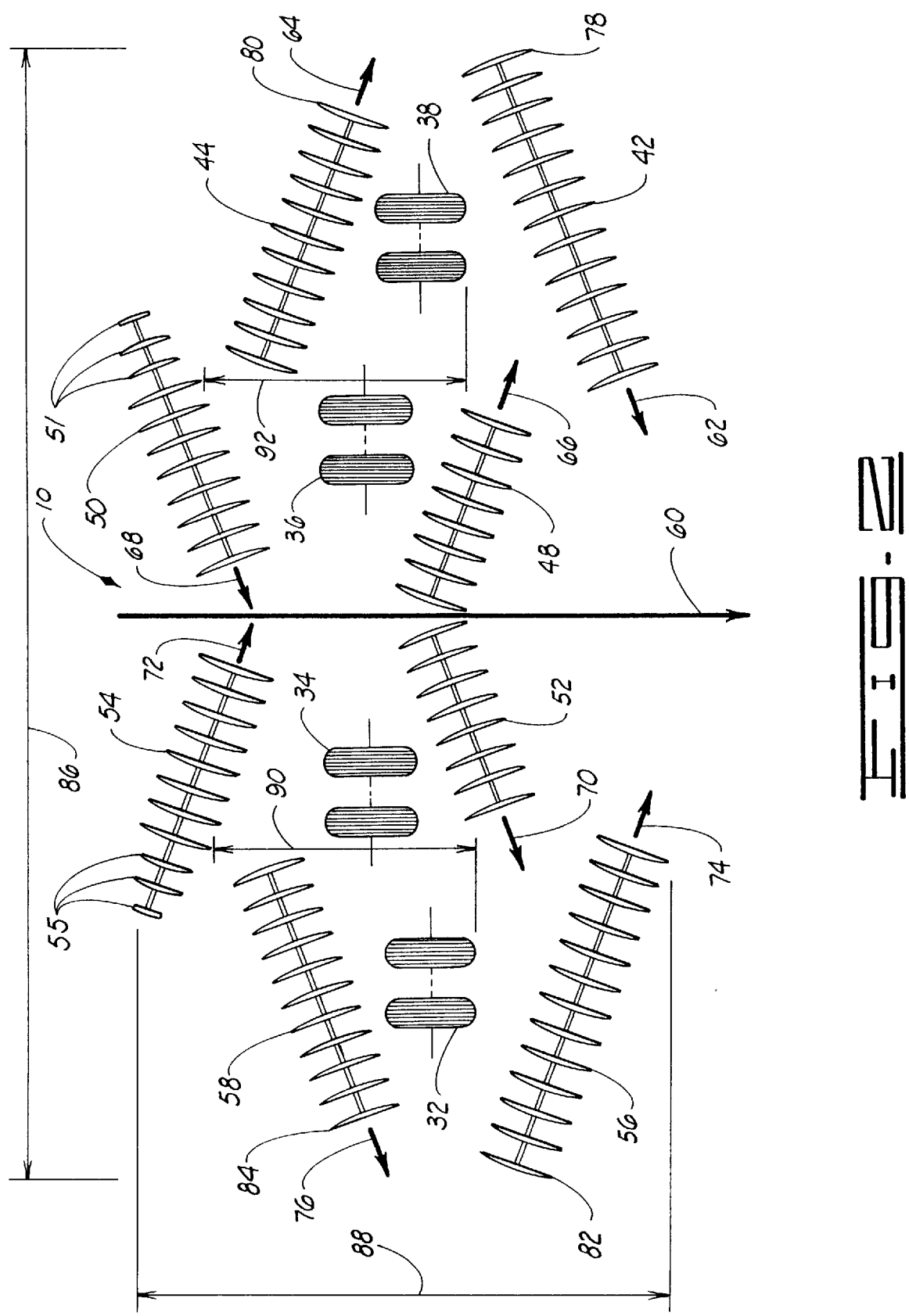

OFFSET/TANDOM DISC-TYPE TILLAGE IMPLEMENT

BACKGROUND OF THE INVENTION

1. Field of the Invention

The present invention relates to farm machinery and more particularly to disc-type tillage equipment.

2. Description of the Prior Art

Prior to this device disc-type tillage devices had many disadvantages such as: they could turn in only one direction while working the ground, or could not be turned at all without raising the device; larger disc devices had a large width to depth ratio so they did not follow changes in ground elevation well; they could only be operated in one direction when trying to get close to an obstacle such as a fence or did not till the ground well near an obstacle; when operated in the direction necessary to get close to an object they often left ridges; and an inexperienced or inattentive operator could easily damage the device by turning or crossing a ditch or ridge.

Traditionally disc-type tillage devices have had two different configurations. One type of disc device is the offset disc which has rows of disc gangs arranged in a V shape, and the other type of disc device is known as the conventional or tandem disc, which has rows of disc gangs arranged in an X shape. With either type, the disc gangs are suspended from a frame which may be connected to a farm tractor, bull dozer or the like.

The offset disc has a row of front discs and a rear row of discs. (The individual discs sometimes being referred to as blades). Each disc or blade is cupped and rotates along a central axis. As the device is pulled, the front row of blades cut the ground and throws it out while the rear row of blades re-cuts the ground and moves it back to about its original position. This type of disc device may only be turned in one direction while in the ground without causing the front blades on the inside of the turn to dig in too deeply. If the blades are allowed to dig in, they will create a ridge and may bend or break. Since, by convention, the rows of blades converge on the left side the offset disc will allow a left-hand turn, but requires lifting out of the ground for a right-hand turn.

The other type of disc device is the conventional disc (sometimes referred to as a tandem) which may generally be designed with a greater width, but has many similar disadvantages. As the conventional disc is pulled over the ground the two rows of front blade gangs (the ones nearest the tractor) cut the ground and throw it outwardly away from the center of the device and then the rear blade gangs re-cut the ground and move it inwardly toward the center of the device. Thus, the ground is tilled and left in generally the same location as it was originally.

This arrangement of gangs is suitable if one is working level ground and traveling straight. However, with an implement of suitable width (left to right) for today's large tractors, the depth (front to rear) is such that when one crosses unlevel ground such as a ditch, the wheels and the blades near the center of the device leave the ground. This not only leaves ground in the bottom of the ditch untilled but also causes the weight of the device to be concentrated on the outer most blades so that they dig in leaving ridges, and possibly even damaging the device. The smaller the depth the less this is a problem, but with the arrangement of the gangs on this type of device, the depth increases significantly as the device gets wider thereby greatly intensifying the problem.

Similarly when one tries to turn the conventional disc device without raising it, the device will tend to pivot around the wheel to the inside of the turn causing the blades on the inside front of the device be pushed considerably against their cup shape. As a result, these blades will cut deeply into the ground and leave a ridge. In a turn such as this it is common for the blades to be bent or broken.

SUMMARY OF THE INVENTION

In view of the foregoing disadvantages inherent in the known types of disc-type tillage devices now present in the prior art, the present invention provides an improved device construction wherein the same can be utilized reliably in those situations where a better width to depth ratio and turning ability is desired. As such, the general purpose of the present invention, which will be described subsequently in greater detail, is to provide a new and improved disc-tillage device which has all the advantages of the prior art disc devices and none of the disadvantages.

To attain this, the present invention essentially comprises a frame supported by a plurality of wheels and connectable to a towing device such as a farm tractor. A plurality of pairs of blade gangs are suspended from the frame for cutting and tilling the ground. The gangs are arranged in pairs with a front gang cutting and throwing the ground in one direction and the rear gang re-cutting and throwing the ground in the opposite direction. The device includes at least one pair of center gangs, at least one pair of outer right gangs and one pair of outer left gangs. The pairs of blade gangs are arranged so that the outer pairs of gangs converge as they extend to the outer width of the device.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is therefore important that the claims be regarded as including such equivalent constructions insofar as they do not depart from the spirit and scope of the present invention.

Further, the purpose of the foregoing abstract is to enable the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved disc-type ground tillage implement which may be easily and efficiently manufactured and marketed.

It is a further object of the present invention to provide a new and improved disc-type ground tillage implement which is of a durable and reliable construction.

An even further object of the present invention is to provide a new and improved disc-type ground tillage implement which provides the advantages of the prior art, while simultaneously overcoming the disadvantages normally associated therewith.

Another object of the present invention is to provide a new and improved disc-type ground tillage implement with an improved width to depth ratio.

Yet another object of the present invention is to provide a new and improved disc-type ground tillage implement which may be turned either to the right or to the left.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top plan view of the device of FIG. 1, showing the arrangement of the blade gangs.

DETAILED DESCRIPTION OF THE PREFERRED EMBODIMENTS

Figure 1:
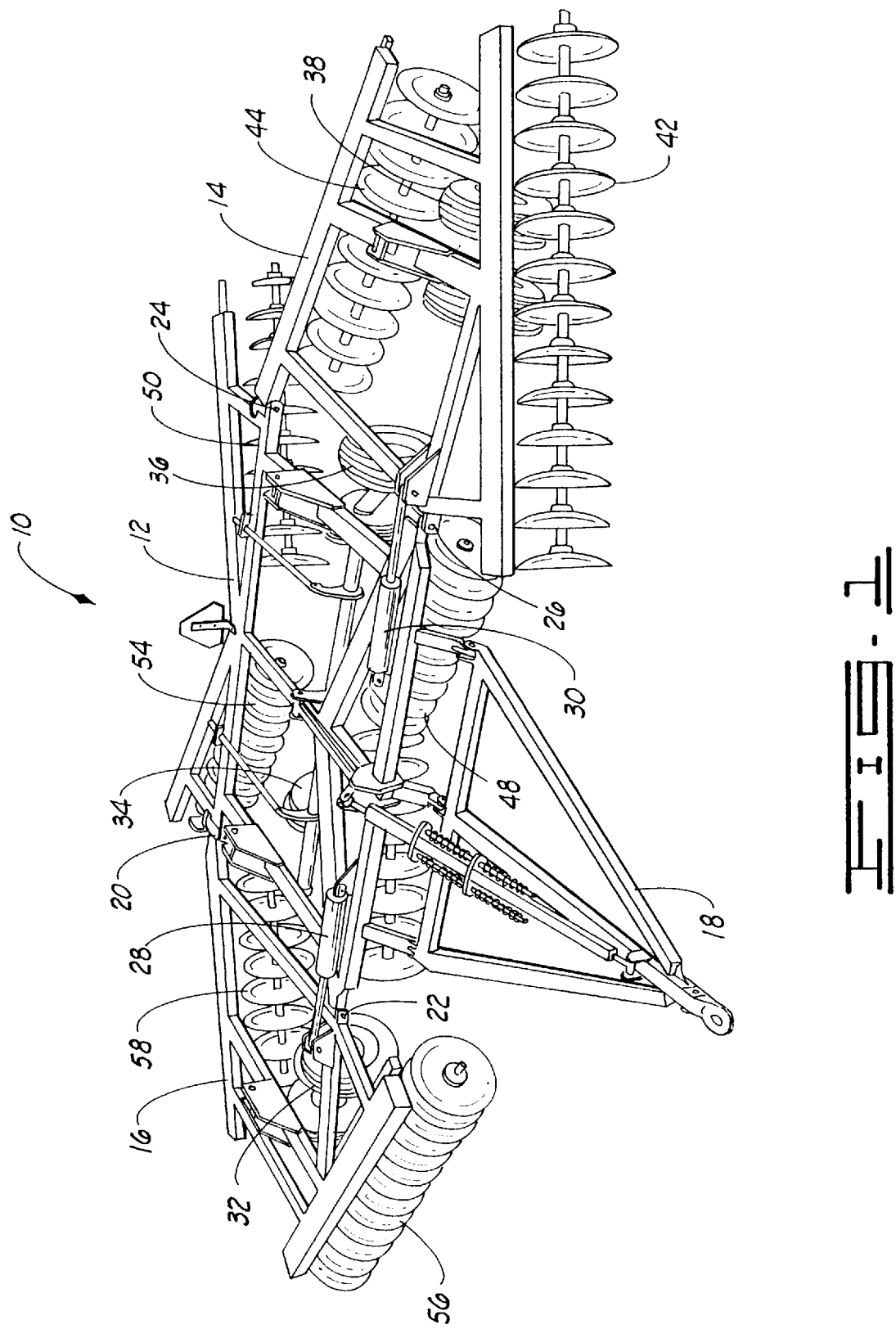
FIG. 1 is a perspective view of a disc-type ground tillage device constructed in accordance with the present invention.

Referring to the drawings in detail and to FIG. 1 in particular, reference character 10 generally designates a disc-type tillage device constructed in accordance with the present invention. The device 10 includes a main frame section 12, left frame section 14 and right frame section 16. A hitch assembly is connected to the main frame section 12 and extends forward therefrom.

For descriptive purposes only the left, right, front, rear, top, bottom, or the like are used herein to describe the various parts and directions of the invention as depicted in FIG. 1. These descriptive terms should not be considered as limiting on the possible orientations of the invention but merely provide a simple method of describing the various parts and directions so they may be readily located in the drawings. In this description the front shall be the part of the device which may be attached to a towing device such as a farm tractor, the left shall be the left hand part of the device when one is facing the same direction as the device may be pulled, and the bottom of the device shall be that part of the device nearest the ground as depicted in FIG. 1.

Preferably the left and right sections, 14 and 16, are hingably connected to the main frame 12 so they may be folded upwardly when transporting the device 10 from one location to another. This may be accomplished by providing hinges, such as hinges 20, 22, 24 and 26. Hydraulic cylinders 28 and 30 may be used to fold, or unfold the left and right frame sections 14 and 16. It should be noted that the main frame section may also include hinge points or additional hinged or foldable frame sections inserted between the main frame section and the left and right frame sections. However, based on the current common horsepower for farm tractors, the single main frame section with single left and right frame sections is preferable.

Wheels are connected to the frames for support and for raising and lowering the frames. As shown in FIG. 1, wheels 32, 34, 36, and 38 are pivotally attached to the frames and may be hydraulically operated to raise or lower the frames.

Pairs of disc, or blade gangs are suspended from the frames 12, 14 and 16. As illustrated in the preferred embodiment, the left frame section 14 has one pair of gangs, the front gang being designated as 42, and the rear gang being designated as 44. The main frame 12 preferably has two pair or four gangs, 48, 50, 52 and 54, and in the most preferred embodiment the front gangs 48 and 52 diverge from the rear gangs 50 and 54 as they extend away from the left-right center of the device 10. The right frame has one pair, or two gangs 56 and 58.

It should be noted that in the outer most blades 51 and 55 on the outer ends of gangs 50 and 54 are preferably clean up discs. That is, the blades 51 and 55 preferably have a smaller diameter and/or pieces removed so that they are not only for cutting and tilling, but are also for leveling the ground.

Referring now to FIG. 2, shown therein is a schematic top plan view of the device 10 showing the placement of the gangs 42, 44, 48, 50, 52, 54, 56 and 58. Arrow 60 indicates the left-right center of the frame and direction of travel when the device 10 is tilling ground. The arrows 62, 64, 66, 68, 70, 72, 74 and 76 indicate the direction ground is thrown when the device is tilling ground.

The arrangement of the blade gangs is very significant, and in particular note that the left front outside gang 42 throws the ground inward toward the center of the device 10 while the rear gang of the pair (the left rear gang 44) re-cuts the ground and throws it back outwardly. This means that the concave surface of the individual blades on the left front gang 42 face inwardly toward the center of the device, and the concave surface of the individual blades on the left rear gang 44 face outwardly away from the device's center. In addition the end 78 of the left front gang 42 and the end 80 of the left rear gang 44 converge as they extend outwardly from the device's center. Since the device tends to pivot around the wheel on the inside of the turn (in the case of a left turn, wheel 38), this arrangement allows one to make left hand turns without the end blades 78 gouging or digging in.

The blade gangs on the right outside, gangs 56 and 58 are similarly arranged to allow the device to make right hand turns. That is, the right front gang 56 throws the ground inward toward the center of the device 10 and the right rear gang 58 re-cuts the ground and throws it back outwardly. The gangs are angled similarly also in that the outer end 82 of the right front gang 56 converges with the outer end 84 of the right rear gang 58. Thus, the device can make either right or left hand turns.

Another important advantage of the device 10 is its improved width (left to right) to depth (front to rear) ratio. This is accomplished by the non-continuous placement of the disc gangs, thus allowing a larger percentage of added width to be incorporated within the existing depth of the device 10. In the preferred embodiment, the left outer gangs 42 and 44 are placed forward of the respective center gangs 48 and 50. The same is done on the right side of the device 10, where the outer gangs 56 and 58 are placed forward of the center gangs 52 and 54. It should be noted that the offset or out of line placement (the forward placement which causes the non-continuous feature) could be to the rear but, offsetting the outer gangs forward is preferable since it allows clean up blades 51 and 55 to be utilized. This is possible in the embodiment illustrated in FIG. 2, since the center gangs diverge as they extend from the left-right center 60 of the frame. This provides a distance 90 and 92 between the front and rear gangs allowing at least one of the gangs from each side to extend from within the distance 90 or 92 and for at least one of the center gangs to extend into a space between the outer pairs of gangs.

The improved width to depth ratio, may be illustrated by examining what would happen if the width of the device is increased by four additional blades. To add four blade widths to the device 10, one could add one additional blade on the outside end of gangs 48, 50, 52 and 54; and one additional blade on the inside end of gangs 42, 44, 56 and 56. Of course the gangs 42, 44 56 and 56 would need to be placed outward from the main frame section to accommodate the additional blades. This would increase the overall device width 86 by four blade spacings, but would only increase the overall device depth 88 by two units (one depth unit is gained by adding blades to gangs 50 and 54; and the other depth unit is gained by adding blades to gangs 42 and 46).

In comparison, increasing the width of an offset type device (the device having V shape) by four blades would add eight units to the overall depth of that device (four units on the front row and four units on the rear row).

The foregoing illustration is not meant as limiting in any way, nor is it the only way in which the device 10 may be widened, but is provided merely as an example of the improved width to depth ratio because the outer gang pairs are non-continous with the center gang pairs.

In operation, the hitch assembly 18 is connected to a towing device such as a farm tractor, dozer or the like and then wheels 32, 34, 36 and 38 are raised. Once the wheels have been raised enough to allow the blades to cut the ground the desired amount, the device is pull across the ground. The device 10 may be pulled through right or left turns as desired. To transport the device from one location to another, the wheels are lowered and, if desired the left and right frames 14 and 16 may be folded upwardly. Preferably a means for locking or pinning the device in the up and folded position is provided.

Changes may be made in the combinations, operations and arrangements of the various parts and elements described herein without departing from the spirit and scope of the invention as defined in the following claims.

I claim:

1. A disc-type ground tillage implement for tilling ground having a frame with a left-right center, the frame being connectable to a towing machine and having multiple gangs of blades connected to the frame, the implement also including a plurality of wheels connected to the frame for supporting and for raising and lowering said frame in relation to the ground, the implement comprising: a plurality of pairs of blade gangs connected to the frame for tilling the ground wherein each gang pair includes a front and a rear gang, there being a pair of outer right blade gangs, at least one pair of center blade gangs and a pair of outer left blade gangs, wherein the front and the rear gangs of each of the outer right and the outer left gang pairs converge as they extend out away from the left-right center of the frame and wherein the outer left and outer right gangs are non-continuous with the at least one pair of center blade gangs.

2. The implement of claim 1 comprising at least two center gang pairs.

3. The implement of claim 2 wherein the front and rear center gangs diverge as they extend away from the left-right center of the frame to an outer end.

4. The implement of claim 3 wherein the rear center gangs include cleanup blades on the outer end thereof.

5. The implement of claim 1 wherein the frame comprises a center main frame section, a left frame section hingeably connected to the main frame section, and a right frame section hingeably connected to the main frame section.

6. The implement of claim 5 wherein the left and the right frame sections fold upwardly for transport.

7. A disc-type ground tillage device, comprising:

a frame with a left-right center;

a plurality of wheels connected to the frame for supporting said frame;

a plurality of pairs of gangs of blades suspended from the frame, including at least two pair of center blade gangs connected to the frame and each pair of gangs extending from about the left-right center outwardly therefrom to an outer end, each center gang pair having a front and a rear gang, said front and rear center gangs diverging as they extend from the left-right center; and a left gang pair having a front and a rear gang, wherein at least one gang of the left gang pair extends from the center gangs, and wherein the left gang pair converges as the gangs of the left gang pair extend outwardly from the left-right center; and a right gang pair having a front and a rear gang, wherein at least one gang of the left gang pair extends from the center gangs, and wherein the right gang pair converges as the gangs of the right gang pair extend outwardly from the left-right center.

8. The device of claim 7 wherein the rear center gangs include cleanup blades on the outer end thereof.

9. The device of claim 7 wherein the frame comprises a center main frame section, a left frame section hingeably connected to the main frame section, and a right frame section hingeably connected to the main frame section.

10. The device of claim 9 wherein the left and the right frame sections fold upwardly for transport.

* * * * *